March 24, 1953　　J. KRAUTHAMER　　2,632,660
UNIVERSAL SWIVEL COUPLING OR JOINT
Filed Dec. 31, 1948
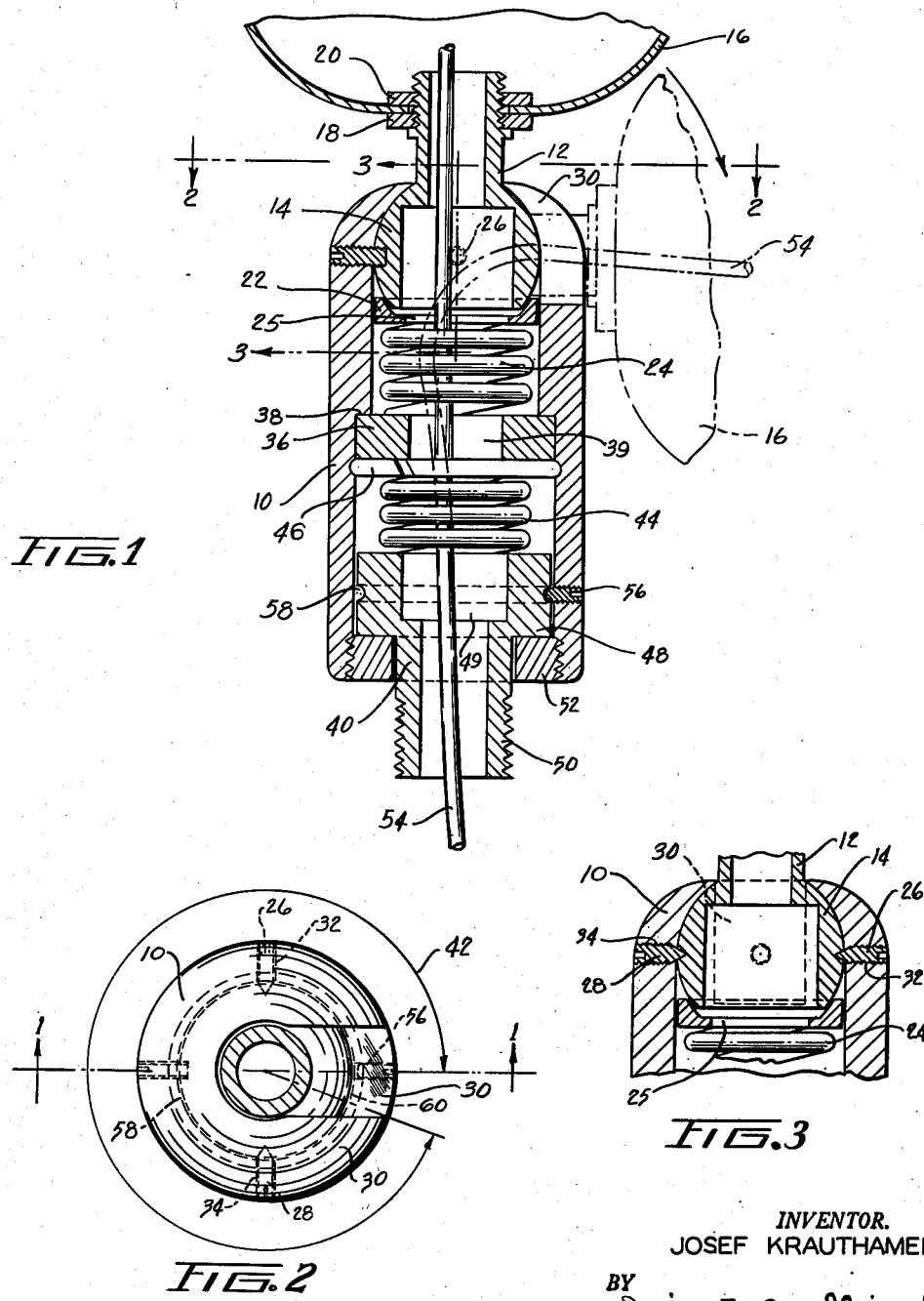
INVENTOR.
JOSEF KRAUTHAMER
BY
Irving H. Goodfriend
ATTORNEY Patented Mar. 24, 1953

2,632,660

UNITED STATES PATENT OFFICE 2,632,660

UNIVERSAL SWIVEL COUPLING OR JOINT

Josef Krauthamer, New York, N. Y.

Application December 31, 1948, Serial No. 68,577

7 Claims. (Cl. 287—12)

This invention relates to a universally adjustable swivel coupling or joint.

The coupling of the present invention has particular application for coupling an electric fixture to a support so that the fixture may be swung or swiveled to a selected position between one in alignment with the longitudinal axis through the coupling or joint and one at the side of the coupling or joint at an angle to the said axis and concurrently rotated about the longitudinal axis to any selected radial position and automatically held in such selected positions.

The present invention still further contemplates the provision of a universal swivel coupling or joint which may be used for a floor lamp, ceiling lamp, wall lamp or similar electric fixture or with any other device which it is desired to selectively place at any angle about its normal axis.

The present invention still further contemplates a universal swivel coupling or joint to be used for an electric fixture or other device and so constructed and arranged that an electric cable for the fixture, although arranged in the interior of the coupling, will not be injured by the selective positioning movement of the coupling.

The present invention still further contemplates a universal swivel coupling or joint, the selective movement of which is limited so that an electric cord arranged therein cannot be twisted by the positioning movement of the coupling.

The present invention still further contemplates the provision of such a coupling or joint which is not complicated in construction the parts of which are easily assembled together and which is relatively inexpensive to manufacture.

These, other and further objects and advantages of the present invention will become apparent from the following description and the drawing appended thereto, in which Fig. 1 is a cross sectional elevation of a universal swivel coupling or joint according to my invention.

Fig. 2 is a section on the line 2—2 of Fig. 1.

Fig. 3 is a section on the line 3—3 of Fig. 1.

Referring now to the drawing, the operative elements of the universal swivel coupling or joint of my invention are mounted in the housing 10, the upper end of which is open to receive therethrough the sleeve or neck 12 integral with and extending out from the ball 14. The interior of the sleeve or neck 12 communicates with the hollow interior of the ball 14 so that there is an open passage therethrough.

A lamp casing or reflector 16 may be secured on the preferably threaded sleeve 12 by the knurled collars or nuts 18 and 20, therebetween. This lamp casing or reflector will therefore be carried with, as will be described, the ball 14 which constitutes a knuckle-like joint.

The ball 14 is seated for movement in the housing in the washer 22 that is held in the housing against it by the expanding coil spring 24, the interior of which communicates with the opening 25 at the center of the washer 22.

The ball 14 is mounted in the housing 10 by the pins 26 and 28 which are screwed into the housing at each side thereof and which pins may be moved on their axes in openings in each side of the housing (see Fig. 3). It is seen that the pins 26 and 28 extend into the ball 14 to provide bearing surfaces therefor.

Thus, the ball 14 may be moved on the pivot pins 26 and 28 so that the lamp casing or reflector 16 may be swung into any position between and from the vertical or upward one in alignment with the longitudinal axis through the coupling or joint, illustrated by the unbroken lines in Fig. 1, to the side or horizontal position at an angle to the longitudinal axis, illustrated by the broken lines in Fig. 1.

In order to permit the ball to be thus moved on the pins 26 and 28, the housing 10, at its upper end, is slotted as at 30 so that the sleeve 12 may move therein between the limiting positions illustrated.

The ball 14 will be held frictionally in any position into which it is thus moved by the action of the expanding spring 24 and the washer 22 which urge and hold the ball against the upper interior of the housing 10 which is shaped to correspond to the ball or knuckle 14.

In assembling the ball 14 in the housing, the pins 26 and 28 are threaded through the openings 32 and 34 in the sides of the housing 10 and inserted into the ball 14.

The thrust washer 36 is inserted into the interior of the housing 10 against the recessed shoulder 38 and holds the spring 24 in position between it and the washer 22. An opening 39 is provided at the center of the thrust washer 36 which communicates with the center of the spring 24.

Between the thrust washer 36 and the cylinder 40, on the latter of which the housing can rotate in a circle as indicated by the arrow 42 (see Fig. 2), I place the second expanding coil spring 44.

One end of the spring 44 is preferably positioned against the washer 36 and the other end against the larger part 48 of the cylinder 40. The wire catch 46 is open at its center and communicates with the interior of the coil spring 44, the interior of which spring 44 communicates with the opening 49 at the center of the cylinder 40.

Integral with and extending down from the larger part 48 of the cylinder 40, I provide the sleeve 50 which is inserted through a suitable opening in the closure ring 52 which closure ring is threaded into the lower end of the housing 10 to close it and support therein the cylinder 40, spring 44 and thrust washer 46.

The spring 44 forces the cylinder 40 against the closure ring 52 and the thrust washer against the shoulder 38 thereby frictionally holding the housing 10 in any assumed position of rotation about the longitudinal axis of the swivel coupling.

In order to limit rotational movement of the housing 10 to one complete rotation about its longitudinal axis and thus prevent any twisting of the electric wire cable 54, I mount the threaded stop pin 56 in a correspondingly threaded opening in a side of the housing 10 so that it projects into the groove 58 cut in the peripheral surface on the sides of the larger part 48 of the cylinder 40.

This groove is closed as at 60 so that when the housing is rotated in a clockwise direction by means of the lamp casing or reflector 16 and the ball sleeve 12, one side of the groove closure 60 is brought against the stop pin 56 to prevent further rotation and when the housing is rotated in a counterclockwise direction, the other side of the groove closure 60 is brought against the stop pin 56 to prevent further rotation in that direction.

It will now be recognized that the wire cable 54 extends through a hollow interior provided throughout along the longitudinal axis of my universal swivel coupling or joint from the source of current to a socket (not shown) on the upper end of the ball sleeve 12.

Thus, when the lamp casing or reflector is moved vertically at an angle to the longitudinal axis of the coupling or joint, the wire 54 will not be cut, damaged or twisted since it projects through this hollow interior of the ball 14 and sleeve 12 and when the housing is rotated radially about this longitudinal axis, the wire likewise will not be damaged or twisted since it is free from engagement with any metallic element of my coupling or joint. It may be desired under certain circumstances to fixedly secure the sleeve 12 in alignment with the housing 10, for example when removing or replacing the wire 54. For this purpose a threaded pin may be inserted through the housing 10 and into the ball 14 in threaded engagement therewith, best seen in Fig. 1.

It will be apparent that I have provided a universal swivel coupling or joint that will automatically assume a stationary fixed position into which it is moved.

It will be further recognized that I have provided such a swivel coupling or joint that is relatively inexpensive to produce, the parts of which are easily assembled and one which can be used with and readily adapted to any type of electrical fixture or other apparatus.

While I have described the specific details of one embodiment of my invention, it will be understood, of course, that various changes may be made thereto by those skilled in the art without departing from the spirit thereof and I, therefore, intend to be limited by the scope of the appended claims in view of the prior art.

I claim:

1. In a universal swivel connection for coupling to a support, an electric fixture having a casing and a wire cable leading thereto, a hollow housing open at the upper end and the lower end thereof, a hollow ball seated for movement in the housing, a sleeve having a hollow interior at the center of the swivel connection and extending from the ball through the upper opening in the housing, the interior of the sleeve communicating with the interior of the ball, said sleeve for connection to the casing, a washer for seating the ball and having an opening at the center thereof communicating with the hollow interior of the ball, said housing having a slot in a side thereof communicating with the upper opening and the interior of the housing, said slot receiving the sleeve for knuckle movement of the ball in the housing at an angle to the longitudinal axis through the housing, a recessed shoulder in the interior of the housing, a thrust washer against the shoulder and open at the center thereof, a first expanding spring between the thrust washer and the first mentioned washer, a hollow cylinder seated in the interior of the housing and having a recessed neck extending through the lower opening to form a second mentioned shoulder on the cylinder, a second expanding spring, and a closure for the lower opening in the housing, said closure having a central opening through which the said neck extends, said shoulder on the cylinder positioned against the closure, said second expanding spring positioned between the cylinder and the thrust washer for forcing the cylinder against the closure and the thrust washer against the first expanding spring, said neck spaced from the closure to permit swiveling of the housing about the cylinder, all openings in the housing, hollow ball, sleeve, first mentioned washer, thrust washer, closure and the interiors of the hollow cylinder, first spring and second spring being aligned for the passage of the wire cable through the interior of the connection to the casing of the electric fixture.

2. The swivel coupling of claim 1, said cylinder having a groove around the outside thereof, a stop in the groove and a pin mounted on the housing and extending into the groove.

3. In combination, a tubular housing provided at one end with an inwardly turned ball seat and said seat being formed with a central opening and said housing being open at its other end, a ball within the housing and seated on said ball seat, a radial sleeve extending from the ball and passing through the opening in the ball seat, said ball and its sleeve being formed with a through opening said housing being formed with an intermediate internal shoulder, a washer insertable through said other open end of the housing and seated on said shoulder, releasable means to retain said washer seated on said shoulder, a spring interposed between the washer and said ball, a stop ring removably attached to the lower open end of the housing, a member having an annular portion seated on said stop ring and disposed within the housing and a sleeve extending from said annular portion and extending through the central opening in said stop ring and a second spring interposed between said washer and member.

4. The combination of claim 3, said housing being formed with a longitudinal slot at the flanged end thereof and having a width substantially equal to the diameter of the opening in said flange and communicating with said opening whereby said ball and sleeve may rotate to bring the sleeve on the ball into said slot and means to pivotally connect said ball to said housing for rotation about an axis passing through the center of the ball at right angles to the axis of said housing.

5. The combination of claim 3, in combination with a second washer interposed between the first spring and the ball.

6. The combination of claim 4, in combination with means to retain the ball against pivotal movement relative to said housing.

7. The combination of claim 3, in combination with means to prevent sliding movement of said member relative to said housing while permitting rotation of said member relative to said housing.

JOSEF KRAUTHAMER.

REFERENCES CITED

The following references are of record in the file of this patent:

UNITED STATES PATENTS

| Number | Name | Date |
|---|---|---|
| 733,970 | Kaesling | July 21, 1903 |
| 1,614,667 | Gillick | Jan. 18, 1927 |
| 1,854,302 | Hansen | Apr. 19, 1932 |
| 2,164,389 | Dickerson | July 4, 1939 |
| 2,456,182 | Goble | Dec. 14, 1948 |
| 2,472,624 | Schwartz | June 7, 1949 |

FOREIGN PATENTS

| Number | Country | Date |
|---|---|---|
| 4,464 | Netherlands | of 1919 |
| 723,955 | France | of 1932 |